(12) United States Patent
Akaishi

(10) Patent No.: US 12,041,207 B2
(45) Date of Patent: Jul. 16, 2024

(54) SHEET FEEDING DEVICE AND IMAGE FORMING APPARATUS INCORPORATING THE SHEET FEEDING DEVICE

(71) Applicant: Ryohsuke Akaishi, Kanagawa (JP)

(72) Inventor: Ryohsuke Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 17/694,909

(22) Filed: Mar. 15, 2022

(65) Prior Publication Data

US 2022/0321723 A1    Oct. 6, 2022

(30) Foreign Application Priority Data

Mar. 30, 2021 (JP) .................. 2021-058636
Sep. 22, 2021 (JP) .................. 2021-154312

(51) Int. Cl.
| | | |
|---|---|---|
| B65H 3/48 | (2006.01) | |
| B65H 1/04 | (2006.01) | |
| B65H 3/08 | (2006.01) | |
| B65H 5/22 | (2006.01) | |
| H04N 1/00 | (2006.01) | |

(52) U.S. Cl.
CPC ........... *H04N 1/00779* (2013.01); *B65H 1/04* (2013.01); *B65H 3/08* (2013.01); *B65H 5/224* (2013.01); *H04N 1/00726* (2013.01)

(58) Field of Classification Search
CPC ...... G03G 15/00; H04N 1/00726; B65H 1/04; B65H 1/20; B65H 3/08; B65H 3/12; B65H 3/124; B65H 3/128; B65H 3/48; B65H 5/22; B65H 5/228; B65H 7/14
USPC .................................................... 271/97, 98
See application file for complete search history.

(56) References Cited

U.S. PATENT DOCUMENTS

| | | | | |
|---|---|---|---|---|
| 4,858,019 A | * | 8/1989 | Ohara | H04N 1/047 271/265.02 |
| 6,636,704 B2 | * | 10/2003 | Weaver | G03G 15/5029 399/45 |
| 8,014,047 B2 | * | 9/2011 | Machida | H04N 1/00748 271/145 |
| 8,210,518 B2 | * | 7/2012 | Suzuki | B65H 3/128 271/97 |

(Continued)

FOREIGN PATENT DOCUMENTS

| | | |
|---|---|---|
| JP | 2010-254462 | 11/2010 |
| JP | 2014-047062 | 3/2014 |

(Continued)

OTHER PUBLICATIONS

Espacenet machine translation of JP2020152537A; https://translationportal.epo.org/emtp/translate/?ACTION=description-retrieval&COUNTRY=JP&ENGINE=google&FORMAT=docdb&KIND=A&LOCALE=en_EP&NUMBER=2020152537&OPS=ops.epo.org/3.2&SRCLANG=ja&TRGLANG=en (Year: 2020).*

*Primary Examiner* — Leslie A Nicholson, III
(74) *Attorney, Agent, or Firm* — Harness, Dickey & Pierce, P.L.C.

(57) ABSTRACT

A sheet feeding device includes a sheet tray, a blower, a feeder, an illuminator, an imager, and circuitry. The sheet tray stacks sheets. The blower blows air to the sheets stacked on the sheet tray and floats an uppermost sheet of the sheets. The feeder feeds the uppermost sheet. The illuminator illuminates the uppermost sheet floating. The imager captures an image including the uppermost sheet illuminated by the illuminator. The circuitry adjusts an imaging condition based on the image captured by the imager.

8 Claims, 14 Drawing Sheets

(56) References Cited

U.S. PATENT DOCUMENTS

| | | | | |
|---|---|---|---|---|
| 8,336,870 | B2* | 12/2012 | Kobayashi | B65H 7/02 |
| | | | | 271/96 |
| 8,797,607 | B2* | 8/2014 | Hayashihara | B65H 7/02 |
| | | | | 271/96 |
| 9,096,399 | B2* | 8/2015 | Umemoto | B65H 7/02 |
| 9,199,810 | B2* | 12/2015 | Shimoyama | B65H 3/128 |
| 9,272,863 | B2* | 3/2016 | Shimoyama | B65H 3/48 |
| 9,340,384 | B2* | 5/2016 | Yabuki | B65H 7/14 |
| 9,359,158 | B2* | 6/2016 | Hino | B65H 1/266 |
| 10,518,992 | B2* | 12/2019 | Edo | B65H 7/04 |

FOREIGN PATENT DOCUMENTS

| | | |
|---|---|---|
| JP | 2014-201413 | 10/2014 |
| JP | 2020-152537 | 9/2020 |

* cited by examiner

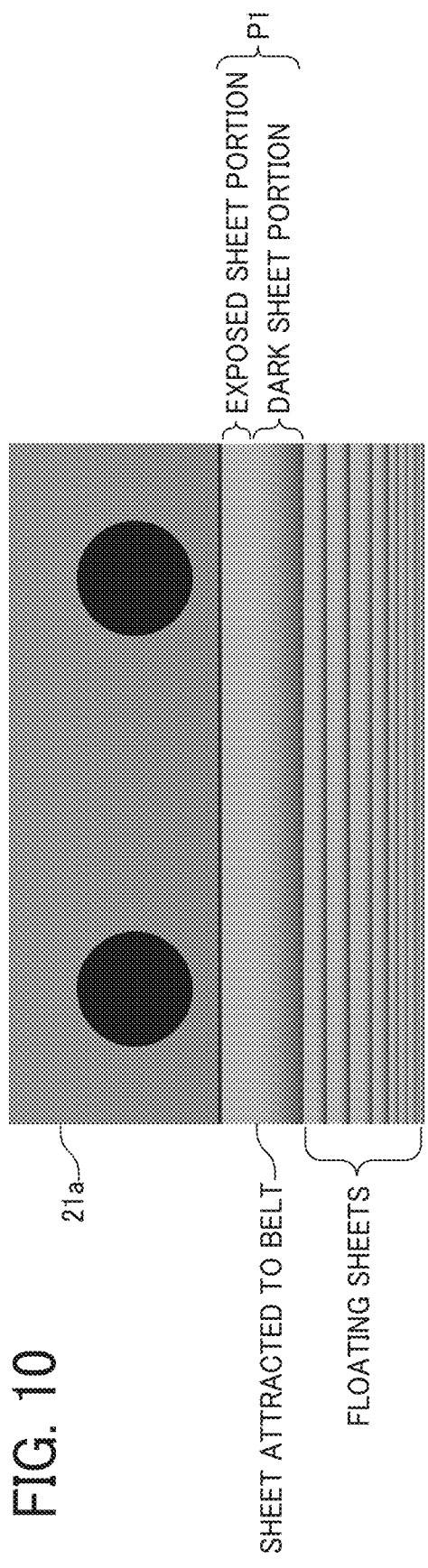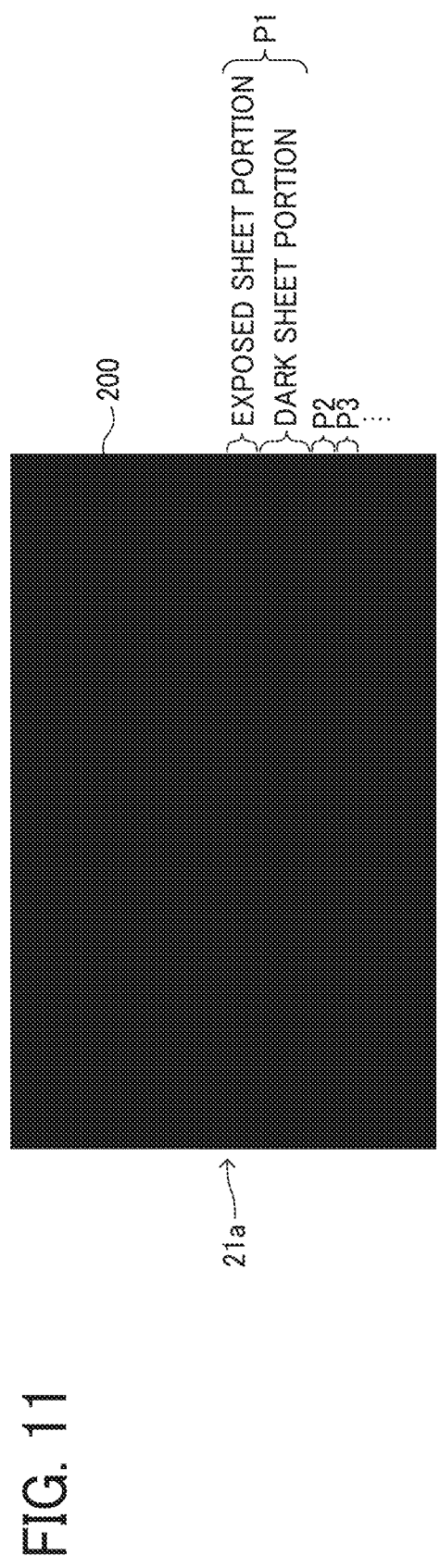

SHEET FEEDING DEVICE AND IMAGE FORMING APPARATUS INCORPORATING THE SHEET FEEDING DEVICE

CROSS-REFERENCE TO RELATED APPLICATIONS

This patent application is based on and claims priority pursuant to 35 U.S.C. § 119(a) to Japanese Patent Applications No. 2021-058636, filed on Mar. 30, 2021, and No. 2021-154312, filed on Sep. 22, 2021, in the Japan Patent Office, the entire disclosure of each of which is hereby incorporated by reference herein.

BACKGROUND

Technical Field

Embodiments of the present disclosure generally relate to a sheet feeding device and an image forming apparatus incorporating the sheet feeding device.

Related Art

One type of sheet feeding device includes a sheet stacker, a blower, a sheet feeder, an imaging device, and an illuminating device. The blower blows air to a sheet bundle stacked on the sheet stacker so that an uppermost sheet of the sheet bundle floats. The sheet feeder feeds the floating uppermost sheet. The illuminating device illuminates the sheet. The imaging device captures an image of the sheet.

SUMMARY

This specification describes an improved sheet feeding device that includes a sheet tray, a blower, a feeder, an illuminator, an imager, and circuitry. The sheet tray stacks sheets. The blower blows air to the sheets stacked on the sheet tray and floats an uppermost sheet of the sheets. The feeder feeds the uppermost sheet. The illuminator illuminates the uppermost sheet floating. The imager captures an image including the uppermost sheet illuminated by the illuminator. The circuitry adjusts an imaging condition based on the image captured by the imager.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is a schematic diagram illustrating an example of an image of a black sheet captured by the imaging device according to the embodiment of the present disclosure;

FIG. 11 is a schematic diagram illustrating an example of a monochrome image obtained by binarizing the image of FIG. 10;

Figure 1:
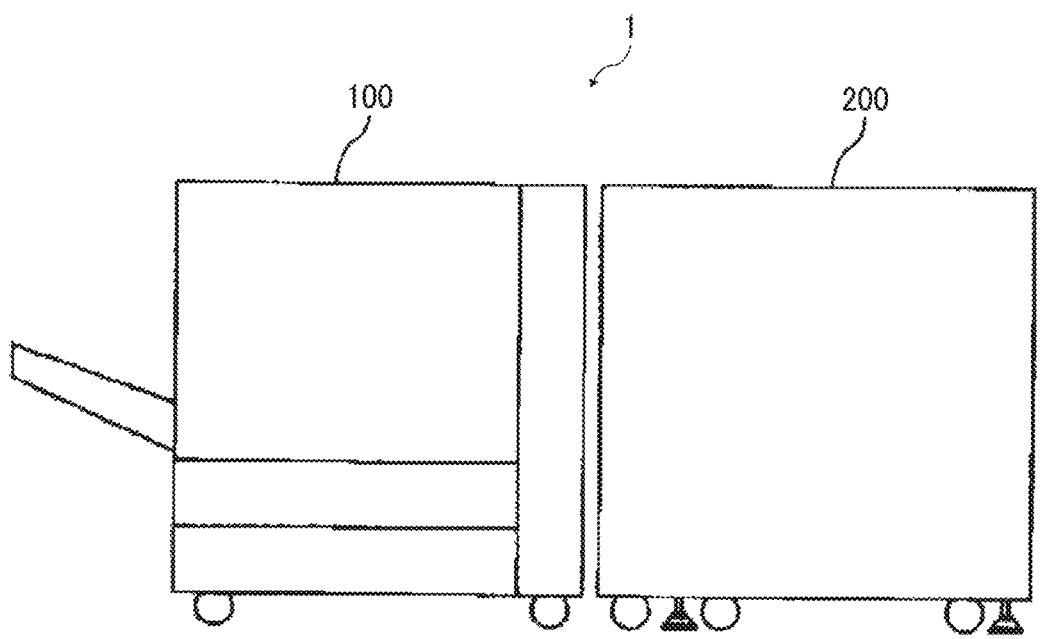
FIG. 1 is a schematic diagram illustrating a configuration of an image forming apparatus including a sheet feeding device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of a sheet feeding device according to an embodiment of the present disclosure.

FIG. 1 is a schematic diagram illustrating a configuration of an image forming apparatus 1 including a sheet feeding device 200 according to the present embodiment.

As illustrated in FIG. 1, the image forming apparatus 1 includes an apparatus body 100 as an image forming device to form an image on a sheet and the sheet feeding device 200 to feed the sheet to the apparatus body 100. The sheet feeding device 200 is disposed on the side of the apparatus body 100.

The recording method of the apparatus body 100 is not particularly limited, and any method such as an electrophotographic method or an inkjet method may be adopted. A sheet inlet portion is on the right side of the apparatus body 100 in FIG. 1. The sheet inlet portion receives the sheet from the sheet feeding device 200. The sheet inlet portion has an opening to receive the sheet and includes a conveyor to convey the sheet.

Figure 2:
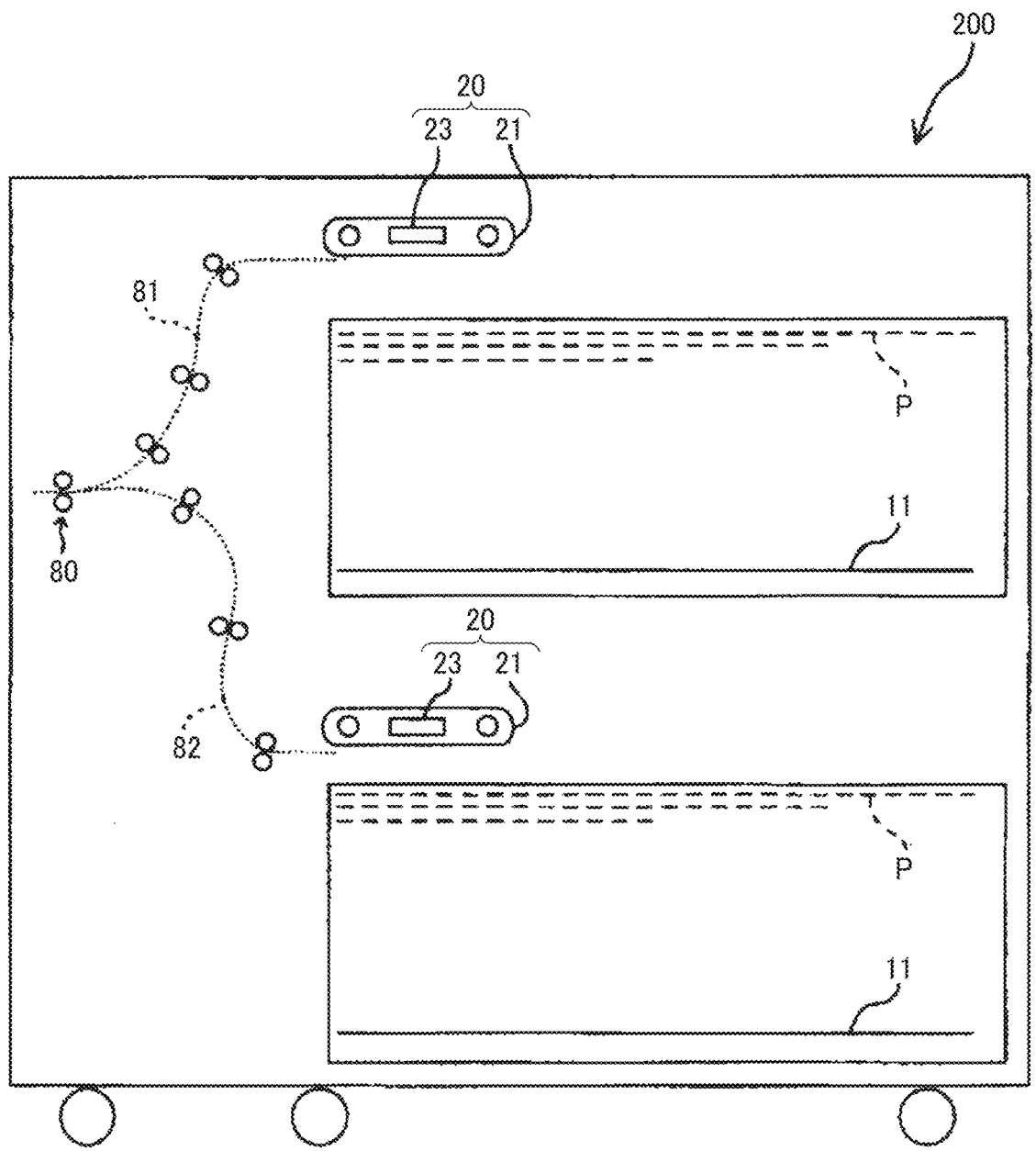
FIG. 2 is a schematic diagram illustrating the sheet feeding device of FIG. 1.

FIG. 2 is a schematic diagram illustrating the sheet feeding device 200.

As illustrated in FIG. 2, the sheet feeding device 200 includes two-stage, upper and lower sheet trays 10. Each of the sheet trays 10 includes a sheet loading table 11 as a sheet loader on which a sheet bundle P is stacked. Each of the sheet trays 10 can accommodate, for example, a maximum of about 2500 sheets.

The term "sheet" includes plain paper, coated paper, label paper, an overhead projector (OHP) transparencies sheet, film, and prepreg. Prepregs are mainly used as materials for laminates and multilayer printed wiring boards. For example, the prepreg includes a sheet-like material that is manufactured by, for example, continuously impregnating a resin varnish mainly formed by a thermosetting resin such as epoxy resin and polyimide resin, into an elongated base such as glass cloth, paper, non-woven cloth, and aramid cloth, then heating, drying, and cutting.

A feeding unit 20 as a feeder is disposed above each of the sheet trays 10 to separate the sheets P stacked in the sheet tray 10 and feed a separated sheet. The feeding unit 20 includes a suction belt 21 as a conveyor and a suction device 23.

The sheets P stacked in the lower sheet tray 10 are conveyed to the apparatus body 100 by an exit roller pair 80 through a lower conveyance path 82. The sheets P stacked in the upper sheet tray 10 are conveyed to the apparatus body 100 by the exit roller pair 80 through an upper conveyance path 81.

Figure 3:
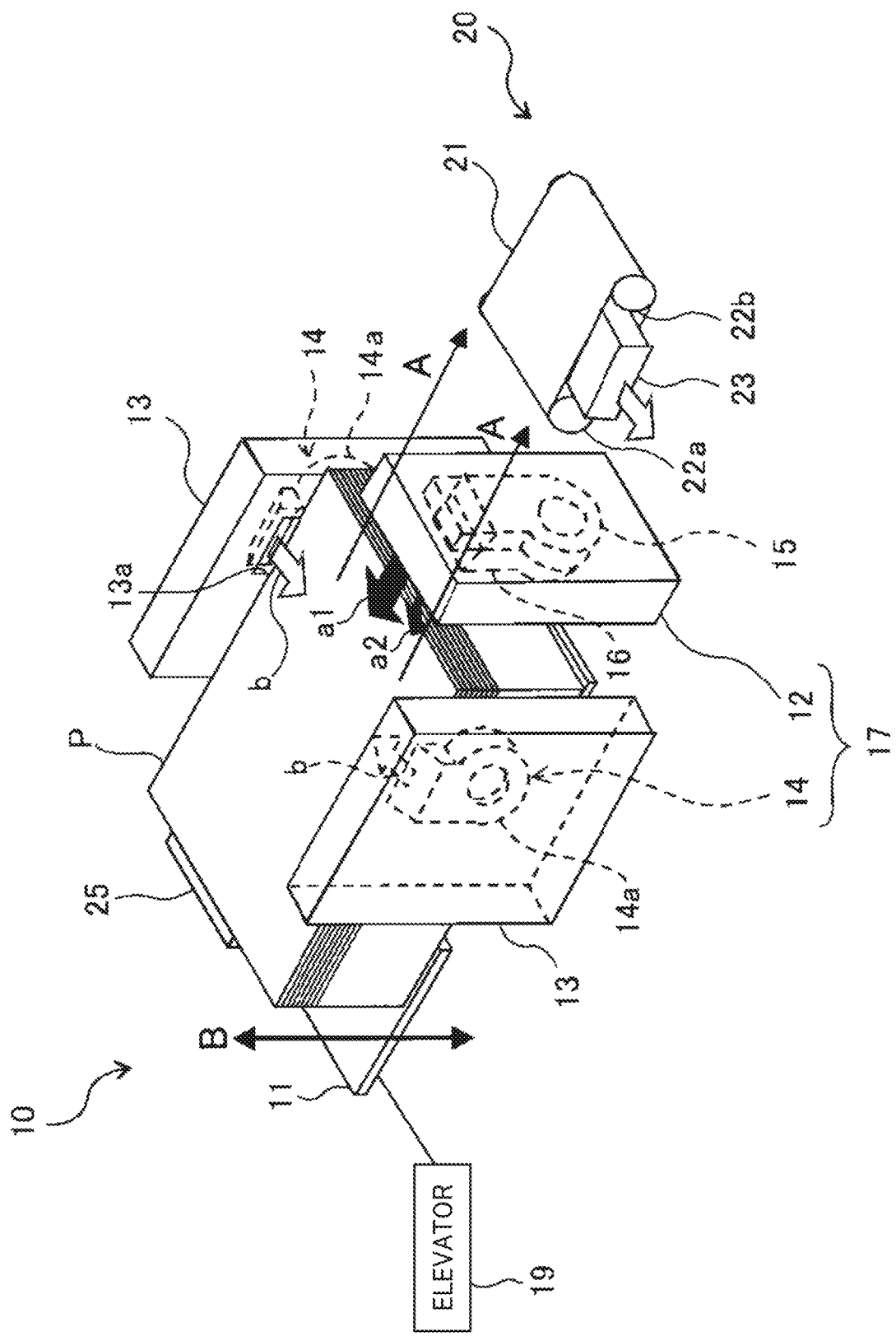
FIG. 3 is a schematic perspective view of a sheet tray of the sheet feeding device of FIG. 2.

FIG. 3 is a schematic perspective view of the sheet tray 10 of the sheet feeding device 200. In FIG. 3, the feeding unit 20 is depicted at the position shifted from the original location in the direction indicated by arrow A for easy understanding. The suction belt 21 of the feeding unit 20 is stretched around two stretch rollers 22a and 22b. The suction belt 21 has suction holes in the entire region in the circumferential direction of the suction belt 21. The suction holes penetrate the suction belt 21 from the front surface to the back surface. The suction device 23 is disposed inside the suction belt 21.

The suction device 23 is coupled to a suction fan to suck air via an air duct that is a flow passage of air and generates a negative pressure below the feeding unit 20 to attract the sheet P onto the lower surface of the suction belt 21. The air sucked by the suction device 23 is called suction air.

Each sheet tray 10 includes a blower device 17 that functions as a blower to blow air onto upper sheets of the sheet bundle P. The blower device 17 includes a front blower unit 12 and side blower units 14.

The front blower unit 12 blows air onto a leading end of the upper part of the sheet bundle P (i.e., a downstream end of the upper part of the sheet bundle P in a sheet feed direction). The front blower unit 12 includes a floating nozzle and a separation nozzle. The floating nozzle guides air in a direction to float the sheets on the upper part of the sheet bundle P. The separation nozzle guides air between an uppermost floating sheet and a floating sheet below the uppermost floating sheet that is referred to as a second sheet to separate the uppermost floating sheet from the sheet bundle P. In addition, the front blower unit 12 includes a floating blower 15 to send air to the floating nozzle and a separation blower 16 to send air to the separation nozzle.

The air blown from the floating nozzle is referred to as floating air and the air blown from the separation nozzle is referred to as separation air. The floating air is blown out from a portion of the floating nozzle facing the leading end of the upper part of the sheet bundle P (i.e., the downstream side of the upper part of the sheet bundle P in the sheet feed direction) in a direction indicated by arrow a1 in FIG. 3 and blown to the leading end of the upper part of the sheet bundle P (i.e., the downstream side of the upper part of the sheet bundle P in the sheet feed direction). The separation air is blown out from a portion of the separation nozzle facing the leading end of the upper part of the sheet bundle P (i.e., the downstream side of the upper part of the sheet bundle P in the sheet feed direction) in a direction indicated by arrow a2 in FIG. 3 and blown to a portion between the uppermost sheet attracted to the suction belt 21 and the floating second sheet P.

The side blower units 14 are mounted in pairs on one side of each of a pair of side fences 13 that position the sheet bundle P in a width direction of the sheet bundle P. Each of the side blower units 14 blows air in a direction indicated by arrow b in FIG. 3, toward the side face of the upper part of the sheet bundle P. Each of the side blower units 14 includes a side floating nozzle and a side blower 14a. The side blower 14a sends air to the side floating nozzle. The side floating nozzle guides air in a direction to separate and float sheets of the sheet bundle P. The air guided in the direction separates sheets of the sheet bundle P each other and floats the sheets. The air blown from the side floating nozzle in the direction indicated by arrow b in FIG. 3 is referred to as side air.

The side air is blown from a side air outlet 13a disposed at a portion of each of the pair of side fences 13, facing the upper part of the sheet bundle P. The side air is blown to the side of the upper part of the sheet bundle P. The air blown from the front blower unit 12 and the side air outlets 13a of the pair of side fences 13 causes the upper sheet of the sheet bundle P to float.

In addition, the sheet tray 10 includes an end fence 25 to align the trailing ends of sheets of the sheet bundle P stacked on the sheet loading table 11 as the sheet loader. An elevator 19 as a table moving device moves the sheet loading table 11 up and down in the direction indicated by arrow B in FIG. 3.

Next, a description is given of sheet feeding operations of the sheet feeding device 200. A controller 60 controls the sheet feeding operations of the sheet feeding device 200 (see FIG. 13). The controller 60 includes circuitry to control the sheet feeding operations of the sheet feeding device 200. The controller 60 is disposed in the apparatus body 100 or the sheet feeding device 200.

The controller 60 receives a command to start sheet feeding from a host controller in the apparatus body 100 and drives the elevator 19 to elevate the sheet loading table 11.

When a sheet detection sensor detects the upper surface of the sheet bundle P, the controller 60 stops driving the elevator 19. Next, the controller 60 starts a blowing control and controls the blower device 17 to start blowing while the suction belt 21 is being stopped. The controller 60 starts a suction control and controls the suction device 23 to start sucking air. When the blower device 17 starts blowing air, the floating air, the separation air, and the side air are blown from the floating nozzle, the separation nozzle, and the side air outlets 13a, respectively to the front end in the upper part of the sheet bundle P.

Blowing the floating air and the side air causes the leading ends of the plurality of sheets P in the upper part of the sheet bundle P to float. The suction device 23 sucks in air to generate a negative pressure below the suction belt 21. The negative pressure attracts the floating uppermost sheet to the suction belt 21. When the uppermost sheet is attracted to the suction belt 21, the separation air blowing to a gap between the uppermost sheet P1 and the second sheet P2 separates the uppermost sheet attracted to the suction belt 21 from the second sheet and subsequent sheets.

Next, the suction belt 21 is rotated to feed the uppermost sheet. At this time, if the second or subsequent sheets excessively floats or are flapped and contacts the uppermost sheet, the second or subsequent sheets are likely to be conveyed together with the uppermost sheet. To avoid the above, the controller that controls the sheet feeding device 200 stops blowing the floating air and the separation air when the suction belt 21 is rotated to start feeding the uppermost sheet.

When a given time has elapsed from the start of feeding (when the leading end of the uppermost sheet P1 is fed to a portion of a given post process (for example, a pair of sheet conveying rollers) downstream from the suction belt 21 in the sheet conveying direction), the controller controls the suction device 23 to stop sucking, and the first sheet attracted to the suction belt 21 is separated. The controller controls a feed motor to stop driving to stop the rotation of the suction belt 21.

When a sheet is fed next, the controller restarts blowing the floating air and the separation air. The suction device 23 restarts sucking air to attract a sheet to the suction belt 21. Thereafter, the controller performs the above-described sheet feeding processing.

Figure 4:
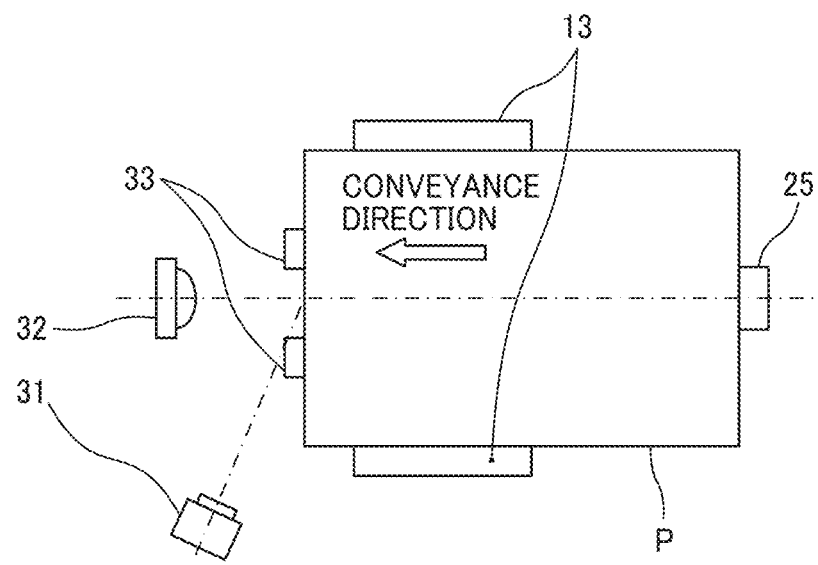
FIG. 4 is a schematic plan view of the sheet tray of FIG. 3.
Figure 5:
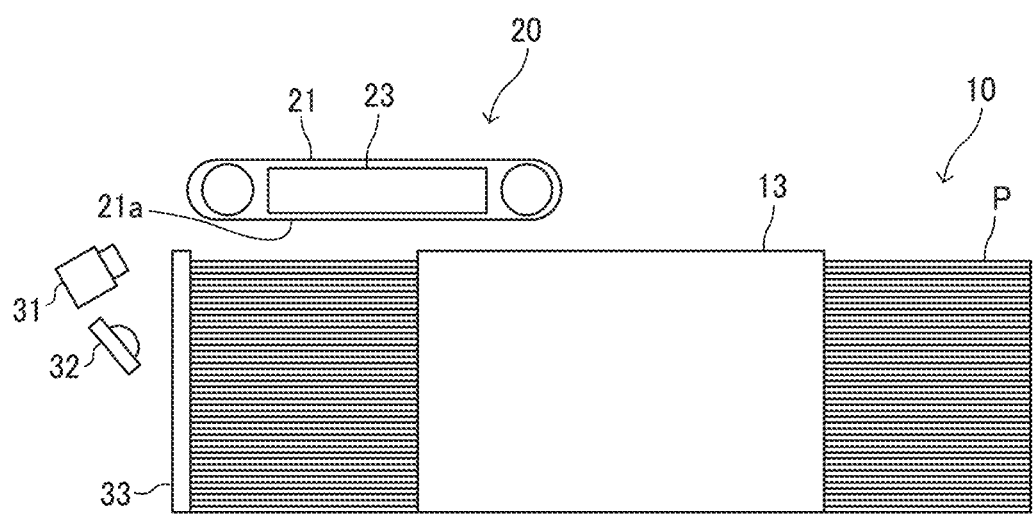
FIG. 5 is a schematic side view of the sheet tray of FIG. 3.

FIG. 4 is a schematic plan view of the sheet tray 10, and FIG. 5 is a schematic side view of the sheet tray 10.

A pair of regulation plates 33 is disposed downstream from the sheet tray 10 in a sheet conveyance direction indicated by arrow in FIG. 4 and aligns the leading ends of sheets of the sheet bundle P. The leading end of sheet of the sheet bundle P stacked on the sheet loading table 11 strikes the regulation plates 33 to regulate and position the leading end of the sheet bundle P.

In addition, the sheet feeding device 200 includes an imaging device 31 and an illuminating device 32 that are near the sheet tray 10. The imaging device 31 serving as an imager is disposed downstream from the sheet tray 10 in the sheet conveyance direction. The illuminating device 32 includes a light source such as a light emitting diode (LED) serving as an illumination unit that illuminates an image capture area of the imaging device 31. The imaging device 31 includes an image acquisition unit 31a such as a charge-coupled device (CCD). Since the interior of the sheet feeding device 200 is covered with an exterior cover, the interior of the sheet feeding device 200 is dark. The controller can not accurately distinguish a belt suction surface 21a of the suction belt 21, the floating sheet, the upper part of the sheet bundle, and the like based on the image captured by the imaging device 31 alone. For this reason, the illuminating device 32 illuminates the image capture area of the imaging device 31, which enables the controller to accurately distinguish the belt suction surface 21a, the floating sheet, and the upper part of the sheet bundle from the captured image.

The illuminating device 32 is disposed at the center of the sheet in the width direction of the sheet and below the imaging device 31 to illuminate the leading end of the center portion of the floating sheet in the width direction of the sheet from a position below the imaging device 31. The imaging device 31 captures the image of the leading end of the center portion of the sheet in the width direction. The illuminating device 32 disposed below the imaging device 31 as described above favorably irradiates the leading end portion of the floating sheet with light. Favorably irradiating the leading end portion of the sheet with light can increase a luminance difference between an exposed sheet portion that is the leading end portion of the sheet and a dark sheet portion that is a portion of the sheet upstream from the leading end portion of the sheet in the sheet feed direction. The imaging device 31 is arranged near one side of the sheet P in the width direction of the sheet P so that the imaging surface of the imaging device 31 faces the center portion of the leading end of the sheet P in the width direction.

Figure 6:
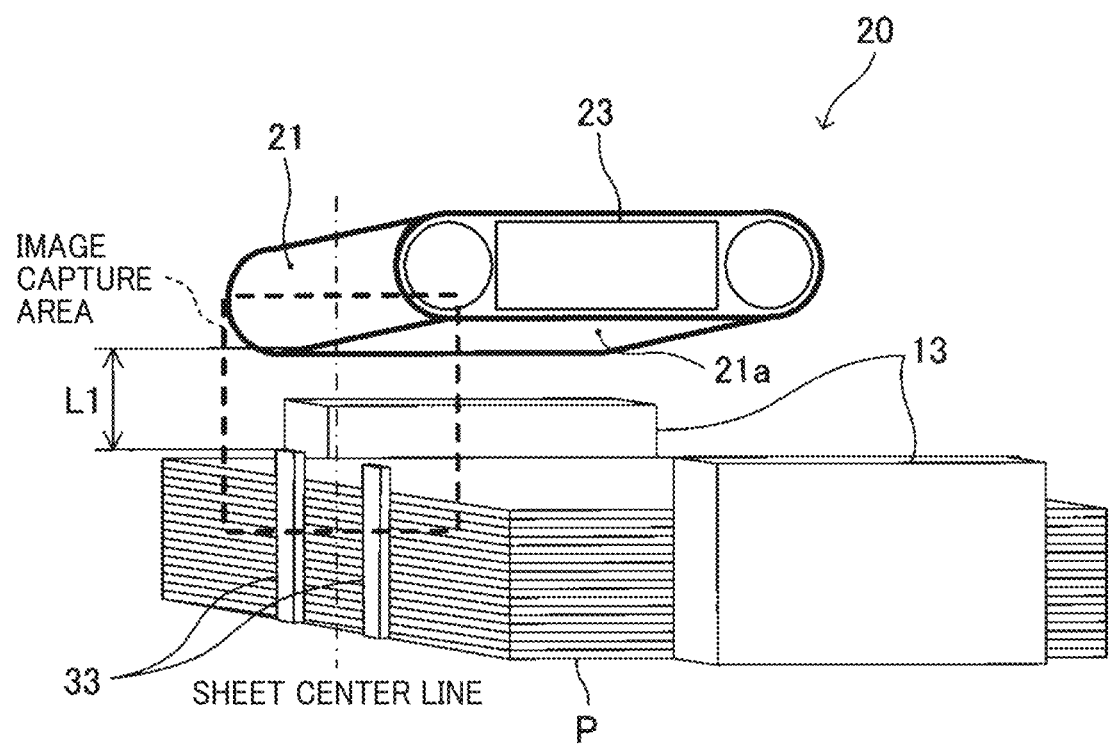
FIG. 6 is a schematic view of a feeding unit and the sheet tray in the sheet feeding device of FIG. 2 to illustrate an image capture area of an imaging device according to the embodiment of the present disclosure.

FIG. 6 is a schematic view of the feeding unit 20 and the sheet tray 10 to illustrate the image capture area of the imaging device 31.

As illustrated in FIG. 6, the upper tips of the pair of regulation plates 33 are separated from the belt suction surface 21a of the suction belt 21 by a distance L1. The image capture area of the imaging device 31 is indicated by a broken line in FIG. 6. The image capture area of the imaging device 31 is set so as to capture the belt suction surface 21a and the upper part of the sheet bundle P positioned so that the upper surface of the sheet bundle P is located at the optimal floating position. Thus, the image captured by the imaging device 31 enables checking the behavior of the floating sheet floating between the belt suction surface 21a and the sheet bundle and the position of the upper surface of the sheet bundle. As a result, the sheet feeding device 200 described above can be made of a smaller number of components by a smaller production cost than a sheet feeding device that includes a sensor detecting the position of the upper surface of the sheet bundle in addition to the imaging device 31.

Figure 7A:
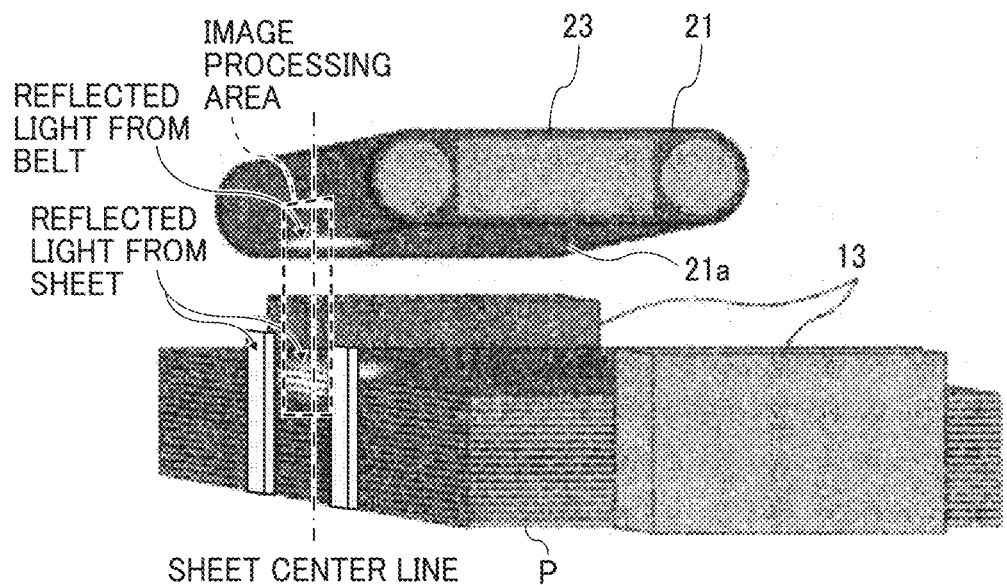
FIG. 7A is a schematic view of the feeding unit and the sheet tray that are illuminated by an illuminating device illustrated in FIG. 4 and FIG. 5.
Figure 7B:
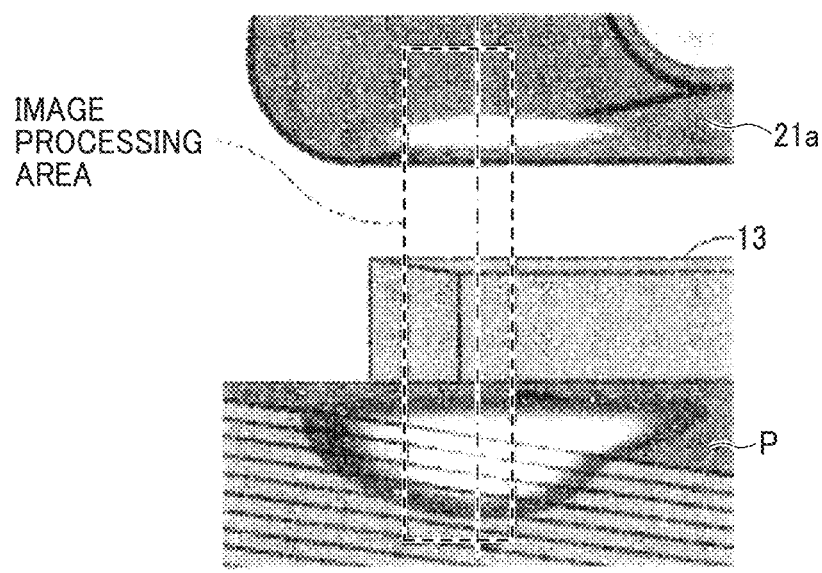
FIG. 7B is a partial enlarged schematic view of FIG. 7A to illustrate an image processing area.

FIG. 7A is a schematic view of the feeding unit 20 and the sheet tray 10 that are illuminated by the illuminating device 32, and FIG. 7B is a partial enlarged schematic view of FIG. 7A to illustrate an image processing area.

As described above, the interior of the sheet feeding device 200 is dark because the interior of the sheet feeding device 200 is covered with an exterior cover. For this reason, the illuminating device 32 is turned on to illuminate a center portion of the belt suction surface 21a of the suction belt 21 in the width direction of the suction belt 21 that is a downstream portion of the belt suction surface 21a in the sheet conveyance direction and the center portion in the width direction and the leading end of the upper part of the sheet bundle as illustrated in FIG. 7A. In addition, the illuminating device 32 illuminates a center portion of the leading edge of the sheet floating between the belt suction surface 21a and the sheet bundle.

The illuminating device 32 illuminates the belt suction surface 21a, the upper part of the sheet bundle, and the floating sheet, and lights reflected by the belt suction surface

21a, the upper part of the sheet bundle, and the floating sheet enter the imaging device 31. The imaging device 31 captures an image in at least the area indicated by a broken line in FIG. 7B.

The imaging device 31 sends image data of the captured image to the controller 60 serving as an image processing unit. The image processing unit binarizes the image within a predetermined image processing area indicated by the broken line in FIG. 7B and detects a floating state of the sheet, a position of the sheet bundle, and the like. The image processing area is set so as to include the belt suction surface 21a, the upper part of the sheet bundle, and the portion of the floating sheet illuminated by the illuminating device 32.

Figure 8:
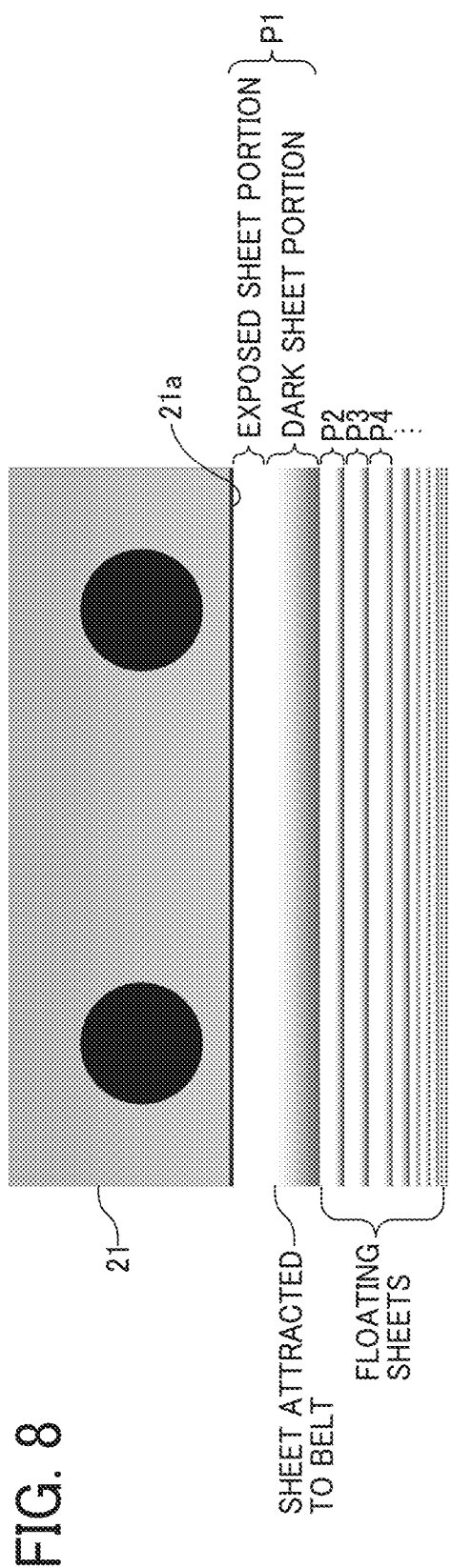
FIG. 8 is a schematic diagram illustrating an example of an image captured by the imaging device according to the embodiment of the present disclosure.

FIG. 8 is a schematic diagram illustrating an example of the image captured by the imaging device 31.

As illustrated in FIG. 8, the image captured by the imaging device 31 includes the exposed sheet portion and the dark sheet portion. Since the illuminating device 32 illuminates the sheet as illustrated in FIG. 7B, a light amount by which the illuminating device 32 illuminates the leading end portion of the sheet is larger than a light amount by which the illuminating device 32 illuminates another portion of the sheet that is an upstream portion of the sheet in the sheet feed direction. The exposed sheet portion corresponds to the leading end portion of the sheet, and the dark sheet portion corresponds to the upstream portion of the sheet in the sheet feed direction. The black circles in FIG. 8 are suction holes of the suction belt 21. In FIG. 8, the uppermost sheet is attracted to the belt suction surface 21a.

Figure 9:
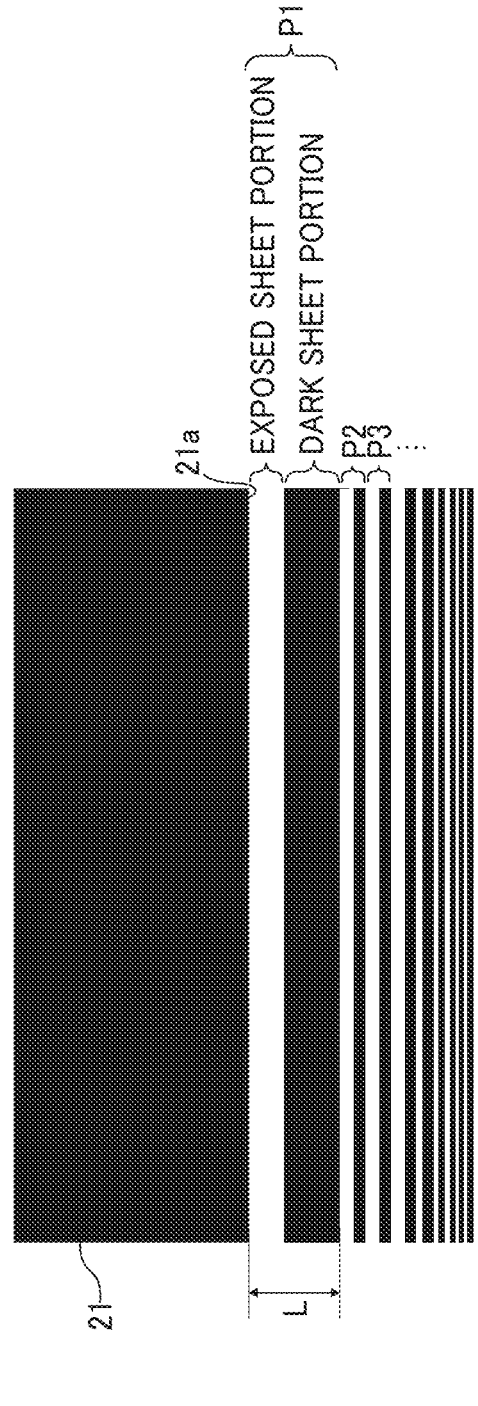
FIG. 9 is a schematic diagram illustrating an example of a monochrome image obtained by binarizing the image of FIG. 8.

FIG. 9 is a schematic diagram illustrating an example of a monochrome image obtained by binarizing the captured image illustrated in FIG. 8. The binarization processing converts a luminance value of a pixel that is less than a predetermined value into 0 (the pixel is drawn by black in FIG. 9) and converts a luminance value of a pixel that is equal to or larger than the threshold value into 255 (the pixel is drawn by white in FIG. 9).

When an imaging condition is optimized for a generally used white sheet, a threshold value of the binarization processing (hereinafter referred to as a binarization threshold value) is near the center of 256 gradation levels (for example, 100 gradation level). In the optimized imaging condition, a monochrome image after the binarization processing becomes as illustrated in FIG. 9. The belt suction surface 21a is painted black, the exposed sheet portion is painted white, and the dark sheet portion is painted black.

After the uppermost sheet P1 is attracted to the suction belt, the separation air flows between the attracted uppermost sheet P1 and the second sheet P2 to separate the second sheet P2 from the uppermost sheet P1. While the second sheet P2 separates from the uppermost sheet P1, the dark sheet portion of the uppermost sheet P1 is getting longer. The image processing unit calculates a length L from a boundary (that is the belt suction surface 21a) between the uppermost black image (that is the suction belt 21) and the uppermost white image (that is the exposed sheet portion of the uppermost sheet) to a boundary between the second black image from the top (that is the dark sheet portion of the uppermost sheet) and the second white image from the top (that is the exposed sheet portion of the second sheet), which are illustrated in FIG. 9. The length L is calculated from the number of pixels from the boundary between the uppermost black image and the uppermost white image to the boundary between the second uppermost black image and the second uppermost white image. In response to becoming the length L equal to a specified length, the controller 60 determines that the second sheet P2 is separated from the uppermost sheet by a specified length and starts driving of the suction belt 21 to feed the uppermost sheet.

In addition, the controller 60, for example, measures a time for which the length L becomes a specified length after the uppermost sheet P1 is sucked by the suction belt 21, determines a floating state of the sheet based on the measured time, and adjusts air volumes of the floating air, the separation air, and the side air.

FIG. 10 is a schematic diagram illustrating an example of an image of a black sheet captured by the imaging device 31.

When the illuminating device 32 directly irradiates a sheet having a low reflectance such as the black sheet, a light amount of light reflected from the leading end of the sheet to the imaging device 31 is small. As illustrated in FIG. 10, the image of the exposed sheet portion captured by the imaging device 31 is dark. The luminance values in the exposed sheet portion are small.

FIG. 11 is a schematic diagram illustrating an example of a monochrome image obtained by binarizing the captured image illustrated in FIG. 10.

Since the luminance values of the exposed sheet portion of the sheet having the low reflectance such as the black sheet are small, the luminance values of the exposed sheet portion captured under the imaging conditions optimized for the white sheet are smaller than the binarization threshold value (that is the gradation value: 100) and are converted into the luminance value "0". As a result, the monochrome image after the binarization processing is entirely painted black as illustrated in FIG. 11. Based on the monochrome image after the binarization processing, the controller 60 cannot detect the uppermost sheet P1 attracted to the suction belt 21 and the floating sheet and check the floating state of the sheet.

For example, setting the binarization threshold value to be smaller than the luminance values of the exposed sheet portion in the captured image illustrated in FIG. 10 changes the exposed sheet portion to be white and the dark sheet portion having the luminance values smaller than the luminance values of the exposed sheet portion to be black after the binarization processing is performed. The above-described setting enables the controller 60 to detect the uppermost sheet P1 attracted to the suction belt 21 and the floating sheet and check the floating state of the sheet.

Figure 12:
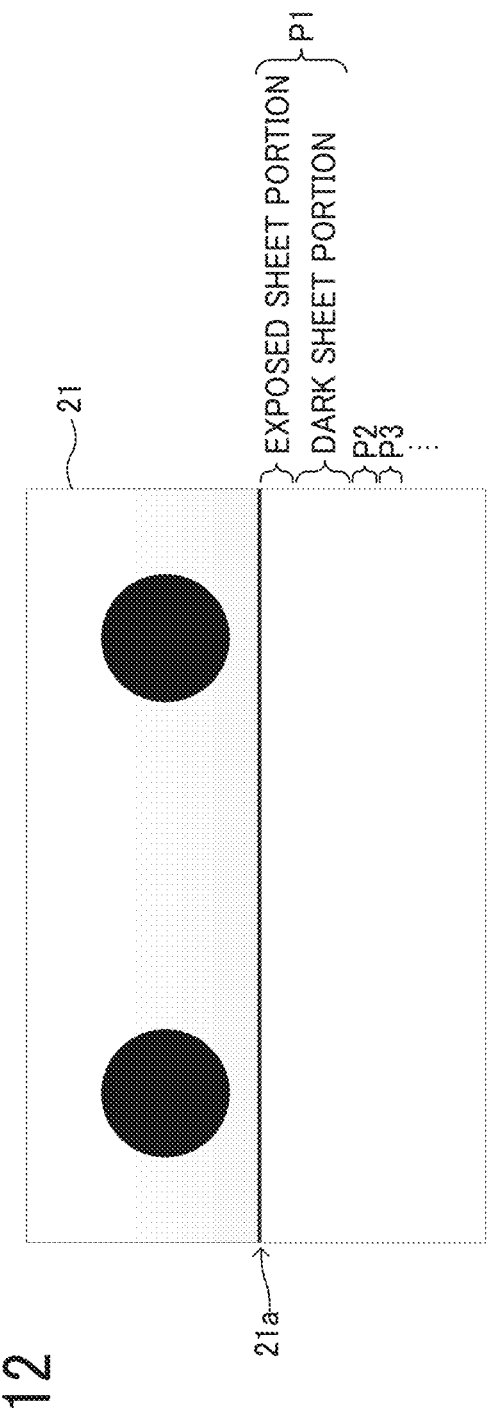
FIG. 12 is a schematic diagram illustrating an example of a monochrome image obtained by binarizing an image of a white sheet captured by the imaging device using a binarization threshold value optimized for the black sheet.

However, when the sheet having a high reflectance such as the white sheet is set in the sheet tray 10, the luminance values of the dark sheet portion having the high reflectance exceeds the binarization threshold value optimized for the sheet having the low reflectance such as the black sheet. As a result, the monochrome image after the binarization processing is entirely painted white as illustrated in FIG. 12. The controller 60 cannot detect the uppermost sheet P1 attracted to the suction belt 21 and the floating sheet and check the floating state of the sheet.

The following countermeasure may be considered. Binarization threshold values corresponding to various types of sheets may be obtained in advance by experiments or the like and stored in a memory of the controller. After the sheet is set in the sheet tray 10, the controller may read the binarization threshold value corresponding to the sheet type set in the sheet tray 10 from the memory and perform the binarization processing using the binarization threshold value. However, it is difficult to prepare the binarization threshold values optimized for all types of sheets. Certain imaging conditions cannot give the binarization threshold value optimized for a certain type of sheet, which is described below.

The controller 60 in the present embodiment adjusts the imaging condition based on the image captured by the imaging device 31 such that the luminance values of the exposed sheet portion in the captured image is equal to or larger than the binarization threshold value and the luminance values of the dark sheet portion are less than the binarization threshold value. A description is given below with reference to the drawings.

Figure 13:
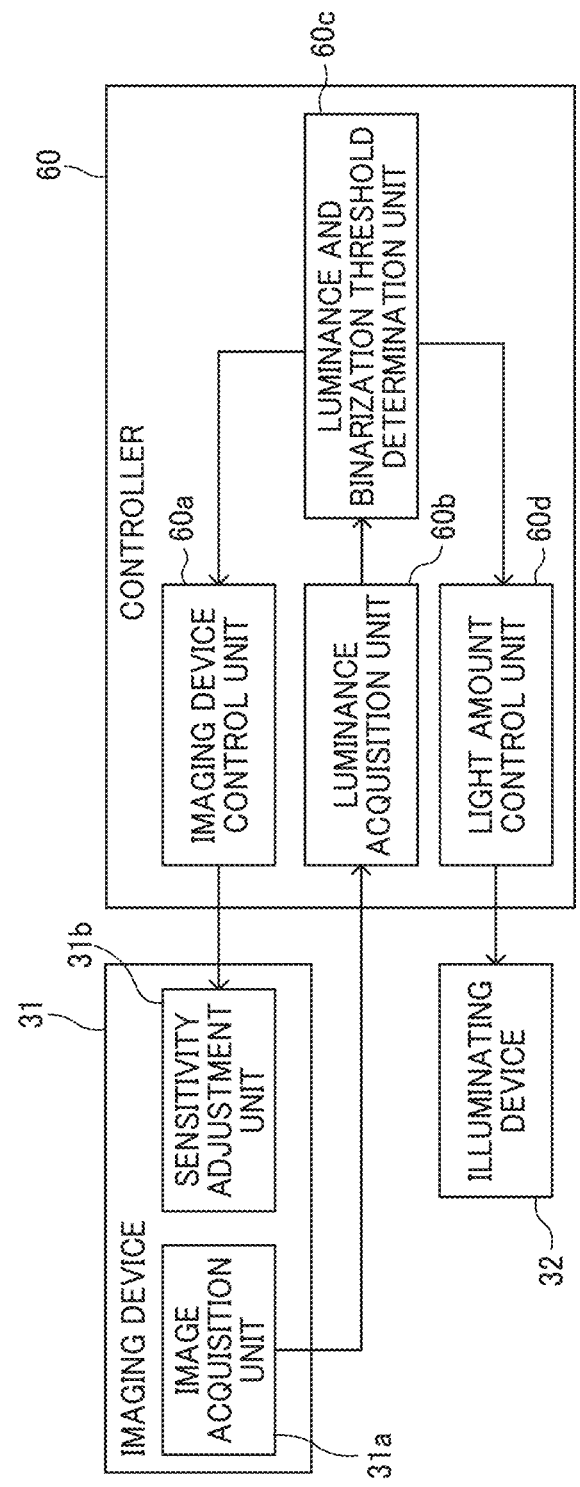
FIG. 13 is a control block diagram illustrating an imaging condition adjustment control system according to the embodiment of the present disclosure.

FIG. 13 is a control block diagram illustrating an imaging condition adjustment control system.

As illustrated in FIG. 13, the imaging device 31 includes an image acquisition unit 31a such as the CCD and a sensitivity adjustment unit 31b serving as an adjustment unit that adjusts the sensitivity of the image acquisition unit 31a.

The controller 60 of the sheet feeding device 200 includes an imaging device control unit 60a that controls the imaging device 31 and a light amount control unit 60d as an adjusting unit that adjusts the light amount of the illuminating device 32. In addition, the controller 60 includes a luminance acquisition unit 60b and a luminance and binarization threshold determination unit 60c. The luminance acquisition unit 60b acquires the luminance value of the exposed sheet portion or the like from the captured image acquired by the image acquisition unit 31a of the imaging device 31. The luminance and binarization threshold determination unit 60c serves as a binarization threshold value determination unit. The luminance and binarization threshold determination unit 60c determines whether the luminance value of the exposed sheet portion or the like acquired by the luminance acquisition unit 60b is within a predetermined range. When the luminance value is not within the predetermined range, the luminance and binarization threshold determination unit 60c sends a sensitivity correction command to the imaging device control unit 60a, or a light amount adjustment command to the light amount control unit 60d. In response to receiving the sensitivity correction command from the luminance and binarization threshold determination unit 60c, the imaging device control unit 60a increases or decreases the sensitivity of the imaging device 31. In response to receiving the light amount correction command from the luminance and binarization threshold determination unit 60c, the light amount control unit 60d controls the illuminating device 32 to increase or decrease the light amount.

Figure 14:
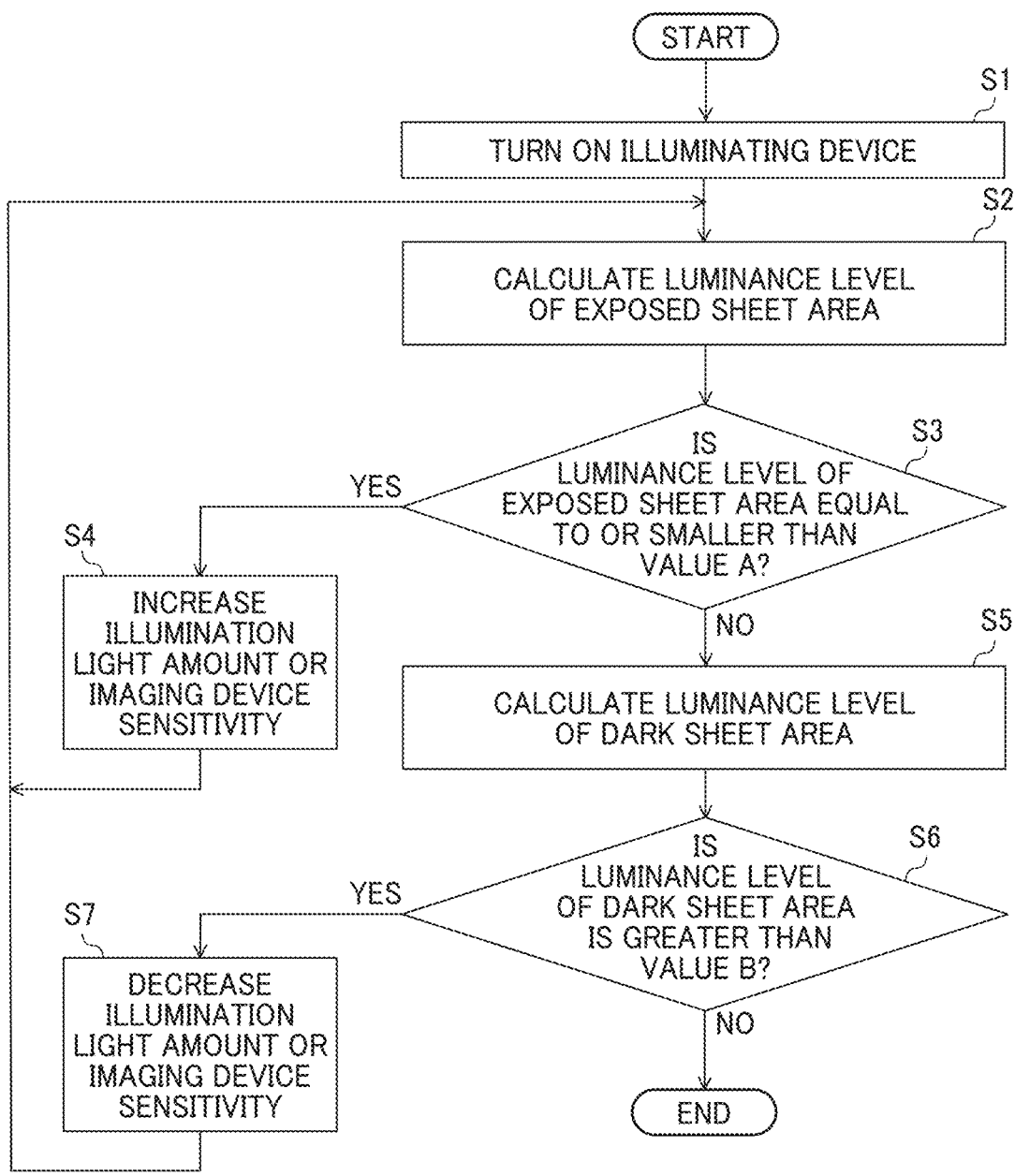
FIG. 14 is a flowchart of an imaging condition adjustment according to the embodiment of the present disclosure.

FIG. 14 is a flowchart of an imaging condition adjustment.

The controller 60 performs the imaging condition adjustment for each print job. The controller 60 may perform the imaging condition adjustment at a first print job after a sheet setting sensor in the sheet tray 10 detects setting sheets. The controller 60 may perform the imaging condition adjustment at a first print job after the sheet feeding device 200 is powered on because the sheet setting sensor in the sheet tray 10 cannot detect setting sheets when a user replaces sheets while the sheet feeding device is powered off.

The controller 60 turns on the illuminating device 32 in step S1 and performs the sheet feeding operations. The imaging device 31 captures the image of the uppermost sheet attracted to the suction belt 21. The imaging device 31 sends the captured image to the luminance acquisition unit 60b. In step S2, the luminance acquisition unit 60b calculates a luminance level of an exposed sheet area α in the sheet illustrated in FIG. 15. The luminance level is an average value calculated from luminance values of a plurality of pixels in the exposed sheet area α.

Next, the luminance and binarization threshold determination unit 60c in the controller 60 determines whether the calculated luminance level in the exposed sheet area α exceeds a value A in step S3.

The value A is obtained by adding a predetermined value to the binarization threshold value. The luminance values of the surface of the sheet vary due to a surface roughness of the sheet and color unevenness of the sheet even in the same type of sheets. The predetermined value is obtained by considering the above-described variation in luminance values of the sheet. In other words, the value A is obtained by considering the above-described variation in luminance values of the sheet for the binarization threshold value.

If the luminance level of the exposed sheet area α is equal to or smaller than the value A, the exposed sheet portion may be the black image after the binarization processing. As a result, the controller 60 may not detect the sheet from the monochrome image after the binarization processing. To avoid the above-described risk, the controller 60 increases an illumination light amount illuminated by the illuminating device 32 or an imaging device sensitivity in step S4 when the luminance level in the exposed sheet area α is equal to or smaller than the value A (YES in step S3). Specifically, the luminance and binarization threshold determination unit 60c in the controller 60 sends the light amount correction command to increase the illumination light amount to the light amount control unit 60d or the sensitivity correction command to increase the imaging device sensitivity to the imaging device control unit 60a when the luminance level in the exposed sheet area α is equal to or smaller than the value A (YES in step S3).

In response to receiving the light amount correction command to increase the illumination light amount from the luminance and binarization threshold determination unit 60c, the light amount control unit 60d controls the illuminating device 32 to increase the illumination light amount. In response to receiving the sensitivity correction command to increase the imaging device sensitivity from the luminance and binarization threshold determination unit 60c, the imaging device control unit 60a controls the sensitivity adjustment unit 31b in the imaging device 31 to increase the sensitivity of the imaging device 31.

As described above, increasing the light amount of the illuminating device 32 as the imaging condition or the sensitivity of the imaging device 31 as the imaging condition increases the luminance values of pixels in the sheet image captured by the imaging device 31. As a result, the luminance values of the exposed sheet portion increase to be equal to or larger than the binarization threshold value, changing the exposed sheet portion in the captured image after the binarization processing to be the white image.

Figure 15:
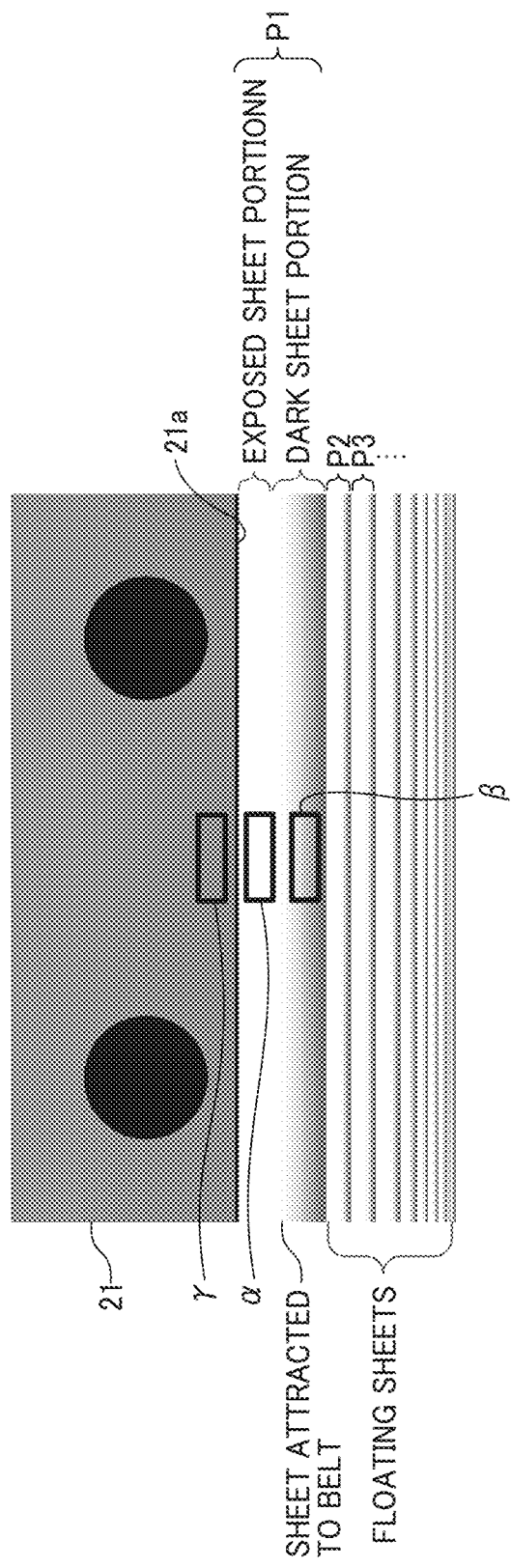
FIG. 15 is a schematic diagram illustrating areas in the image of FIG. 8 to acquire luminance levels according to the embodiment of the present disclosure.

When the luminance level in the exposed sheet area α exceeds the value A (NO in step S3), the luminance acquisition unit 60b calculates a luminance level of a dark sheet area β illustrated in FIG. 15 (that is an average value calculated from luminance values of pixels in the dark sheet area β) in step S5.

Next, the luminance and binarization threshold determination unit 60c in the controller 60 determines whether the calculated luminance level in the dark sheet area β is smaller than a value B. The value B is obtained by considering the above-described variation in luminance values of the sheet for the binarization threshold value. If the luminance level of the dark sheet area β is equal to or larger than the value B (YES in step S6), the dark sheet portion may be the white image after the binarization processing. As a result, the controller 60 may not detect the sheet from the monochrome image after the binarization processing. To avoid the above-described risk, the controller 60 decreases the illumination light amount illuminated by the illuminating device 32 or the sensitivity of the imaging device 31 in step S7.

As described above, decreasing the light amount of the illuminating device 32 as the imaging condition or the sensitivity of the imaging device 31 as the imaging condition decreases the luminance values of pixels in the sheet image captured by the imaging device 31. As a result, the luminance values of the dark sheet portion decrease to be equal to or smaller than the binarization threshold value, changing the dark sheet portion in the captured image after the binarization processing to be the black image.

An adjustment amount of the light amount of the illuminating device 32 and an adjustment amount of the sensitivity of the imaging device 31 may be predetermined values or may be determined based on the difference between the luminance level and the binarization threshold value.

Then, the above-described flow is repeated until the luminance level of the exposed sheet area α exceeds the value A (NO in step S3), and the luminance level of the dark sheet area β is smaller than the value B (NO in step S6).

After the controller 60 adjusts the illumination light amount of illuminating device 32 or the sensitivity of the imaging device 31, the imaging device 31 acquires the image including the uppermost sheet attracted to the suction belt 21, and the controller 60 calculates the luminance level of the exposed sheet area α and the luminance level of the dark sheet area β. In the above, the uppermost sheet is attracted to the suction belt 21 until the imaging condition adjustment is completed. In response to completing the imaging condition adjustment, the suction belt 21 is rotated to convey the uppermost sheet attracted to the suction belt 21. Alternatively, the uppermost sheet attracted to the suction belt 21 may be conveyed before the completion of the imaging condition adjustment, and when the next sheet is fed, the imaging device 31 may acquire the image including the uppermost sheet attracted to the suction belt 21 again after the controller 60 adjusts the light amount of illuminating device 32 or the sensitivity of the imaging device 31.

In the above description, the controller 60 adjusts either one of the light amount of the illuminating device 32 and the sensitivity of the imaging device 31 but may adjust both the light amount of the illuminating device 32 and the sensitivity of the imaging device 31. For example, the controller 60 may alternately perform the adjustment of the light amount of the illuminating device 32 and the adjustment of the sensitivity of the imaging device 31. Since increasing the sensitivity may deteriorate image quality, the controller 60 may increase the light amount of the illuminating device 32 to increase the luminance and decrease the sensitivity of the imaging device 31 to decrease the luminance. The controller 60 may firstly adjust one of the light amount of the illuminating device 32 and the sensitivity of the imaging device 31 and secondly adjust the other one after adjusting the one of them reaches the adjustment limit.

Executing the imaging condition adjustment flow illustrated in FIG. 14 enables forming the monochrome image after the binarization processing for the captured image so as to include the white image as the exposed sheet portion and the black image as the shadow portion of the sheet. As a result, the controller can satisfactorily detect the sheet from the monochrome image and check the floating state of the sheet based on the monochrome image.

In the above description, the controller adjusts the imaging condition using the luminance level of the exposed sheet portion and the luminance level of the dark sheet portion but may adjust the imaging condition using only the luminance level of the exposed sheet portion. The luminance difference between the luminance of the exposed sheet portion and the luminance of the dark sheet portion does not depend on the reflectance of the sheet. The luminance difference is determined by the illumination state of the illuminating device 32 illuminating the sheet and the imaging angle of the imaging device 31. Accordingly, using the luminance level of the exposed sheet portion and not using the luminance level of the dark sheet portion, the controller may adjust the imaging condition so that the image after the binarization processing includes the white image as the exposed sheet portion and the black image as the dark sheet portion.

Figure 16:
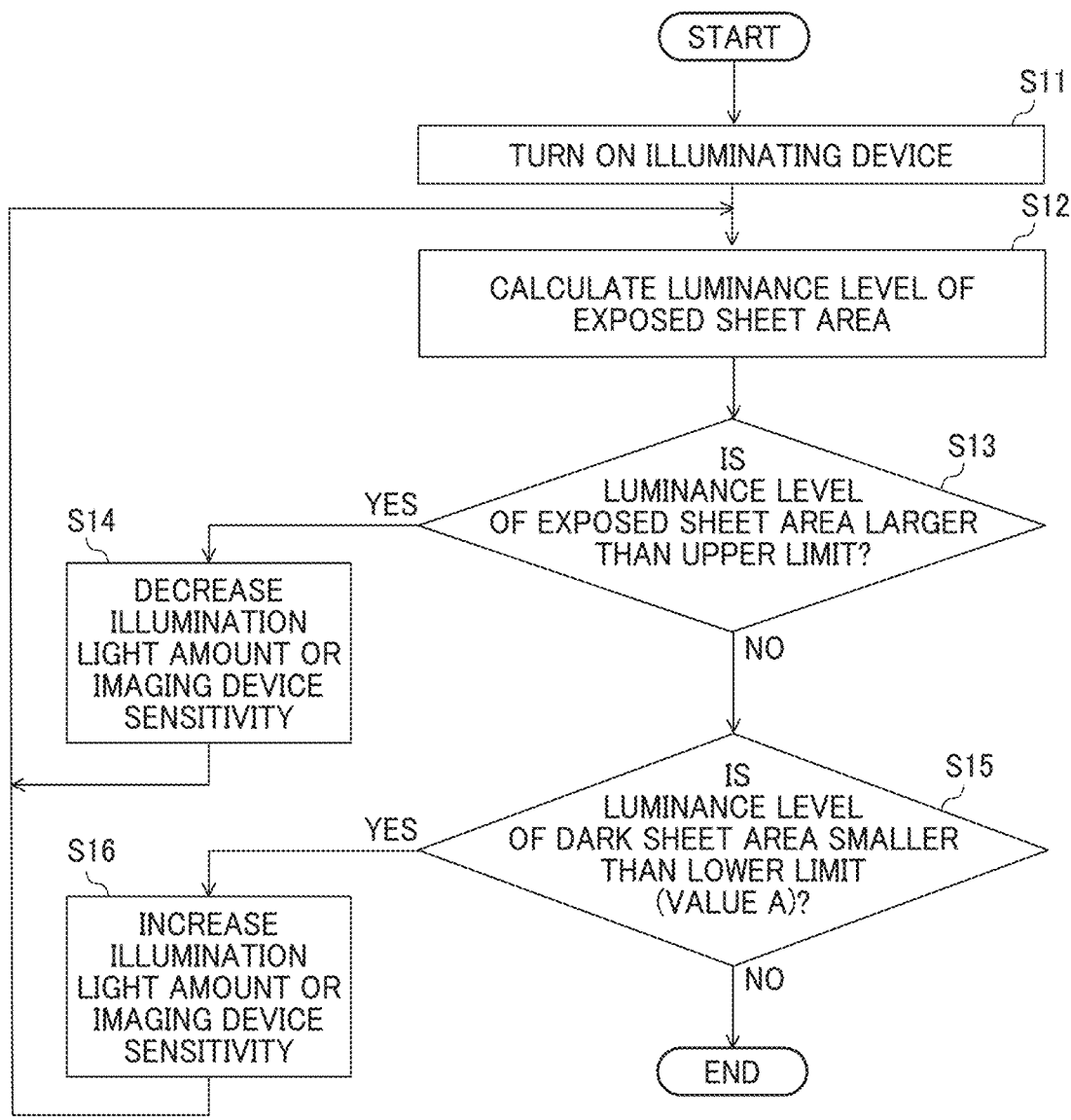
FIG. 16 is a flowchart of imaging condition adjustment using the luminance level of an exposed sheet portion.

FIG. 16 is a flowchart of imaging condition adjustment using the luminance level of the exposed sheet portion and not using the luminance level of the dark sheet portion.

Similar to the above description, the imaging device 31 captures the image including the uppermost sheet attracted to the suction belt 21 after the illuminating device 32 is turned on in step S11. The luminance acquisition unit 60b in the controller 60 calculates an average value of pixels in the exposed sheet area α. as the luminance level of the exposed sheet portion in step S12.

Next, the luminance and binarization threshold determination unit 60c in the controller 60 determines whether the calculated luminance level in the exposed sheet area α exceeds an upper limit in step S13. The upper limit is, for example, smaller than a value obtained by adding the luminance difference between the exposed sheet portion and the dark sheet portion to the binarization threshold value. When the calculated luminance level in the exposed sheet area α is larger than the upper limit (YES in step S13), the luminance value of the dark sheet portion may exceed the binarization threshold value, and the dark sheet portion may be the white image after the binarization processing. To avoid the above-described risk, the controller 60 decreases the light amount illuminated by the illuminating device 32 or the sensitivity of the imaging device 31 in step S14.

When the luminance level of the exposed sheet area α is smaller than a lower limit (that is the value A described above) (Yes in step S15), the luminance value of the sheet exposed portion may be smaller than the binarization processing threshold value, and the image of the exposed sheet portion after the binarization processing may be a black image. To avoid the above-described risk, the luminance and binarization threshold determination unit 60c in the controller 60 increases the light amount illuminated by the illuminating device 32 or the sensitivity of the imaging device 31 in step S16, which is similar to the above description.

Executing the imaging condition adjustment flow illustrated in FIG. 16 also enables forming the monochrome image after the binarization processing for the captured image so as to include the white image as the exposed sheet portion and the black image as the dark sheet portion. As a result, the controller can satisfactorily detect the sheet from the monochrome image and check the floating state of the sheet based on the monochrome image.

Figure 17:
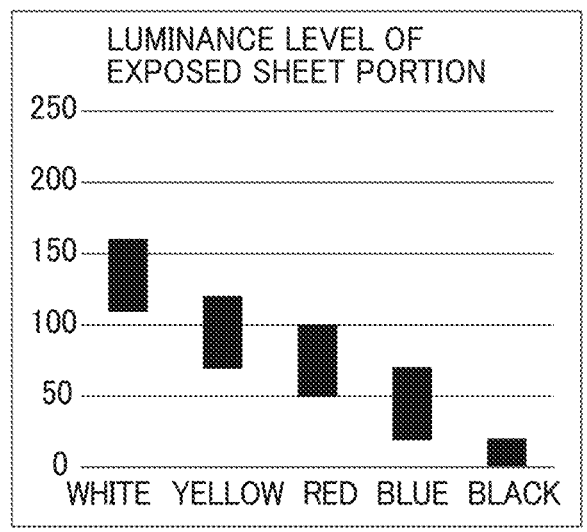
FIG. 17 is a graph illustrating luminance values of the exposed sheet portion in each of images of various color sheets captured under the imaging condition optimized for the white sheet.
Figure 18:
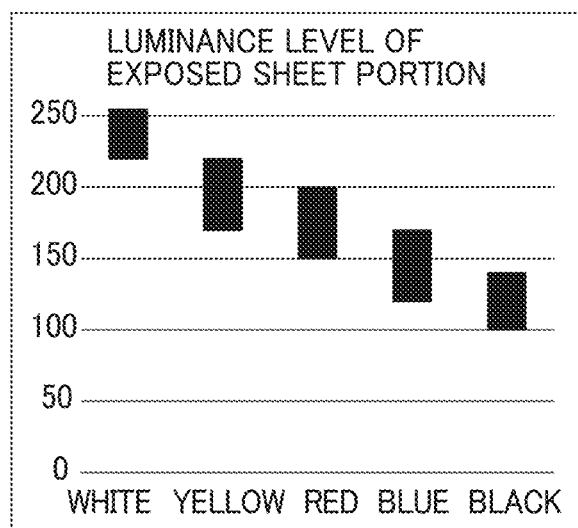
FIG. 18 is a graph illustrating luminance values of the exposed sheet portion in each of images of various color sheets captured under the imaging condition optimized for the black sheet.

FIG. 17 is a graph illustrating luminance values of exposed sheet portions of various color sheets imaged under the imaging condition optimized for the white sheet. FIG. 18 is a graph illustrating luminance values of exposed sheet portions of various color sheets imaged under the imaging condition optimized for the black sheet. In FIGS. 17 and 18, the binarization threshold value is 100.

As illustrated in FIG. 17, the imaging condition optimized for the white sheet by the imaging condition adjustment control sets the luminance values of the exposed sheet portion of the white sheet to values slightly higher than the luminance value (100) as the binarization threshold value.

The imaging condition sets the luminance values of the dark sheet portion having a certain luminance difference with respect to the exposed sheet portion to be smaller than the luminance value (100) as the binarization threshold value. As a result, the monochrome image after the white sheet is binarized includes the white image as the exposed sheet portion and the black image as the dark sheet portion, and the controller can satisfactorily detect the sheet.

In FIG. 17, the luminance values of the exposed sheet portion of the black sheet is zero or nearly zero under the imaging condition optimized for the white sheet. If a controller cannot change the imaging condition and determines a binarization threshold value according to the sheet under the imaging condition optimized for the white sheet, the controller cannot set the binarization threshold value for the black sheet that is smaller than the luminance values of the exposed sheet portion and larger than the luminance values of the dark sheet portion.

In contrast, the sheet feeding device in each of the present embodiments adjusts the image condition in accordance with the sheet so that the luminance values of the exposed sheet portion of the black sheet is near the center of an output range of the imaging device 31 that is expressed by 256 gradations as illustrated in FIG. 18. As a result, the luminance values of the exposed sheet portion of the black sheet is equal to or larger than the luminance value as the binarization threshold value, and the luminance values of the dark sheet portion of the black sheet is smaller than the luminance value as the binarization threshold value. Thus, the monochrome image after the black sheet is binarized includes the white image as the exposed sheet portion and the black image as the dark sheet portion, and the controller can satisfactorily detect the sheet.

Adjusting the imaging condition in accordance with the sheet as described above enables detecting various types of sheets from the captured image captured by the imaging device 31, compared to adjusting the binarization threshold value in accordance with the sheet under the fixed imaging condition.

In the above-described imaging condition adjustment, the binarization threshold value is fixed, but the controller may adjust the binarization threshold value in addition to the imaging condition. Adjusting both the imaging condition and the binarization threshold value decreases the frequency of changing the imaging condition to adjust the imaging condition. Adjusting the binarization threshold value in addition to the imaging condition enables adjusting a sheet that does not allow to give the luminance value of the exposed sheet portion larger than the binarization threshold value within an adjustment range of the imaging condition and a sheet that does not allow to give the luminance value of the dark sheet portion smaller than the binarization threshold value. When the sheets in the sheet tray 10 are exchanged from the sheets having a high reflectance such as the white sheets to the sheets having a low reflectance such as the black sheets, adjusting the binarization threshold value in addition to the imaging condition shortens a time for the adjustment because adjusting both the imaging condition and the binarization threshold value decreases the frequency of changing the imaging condition.

Figure 19:
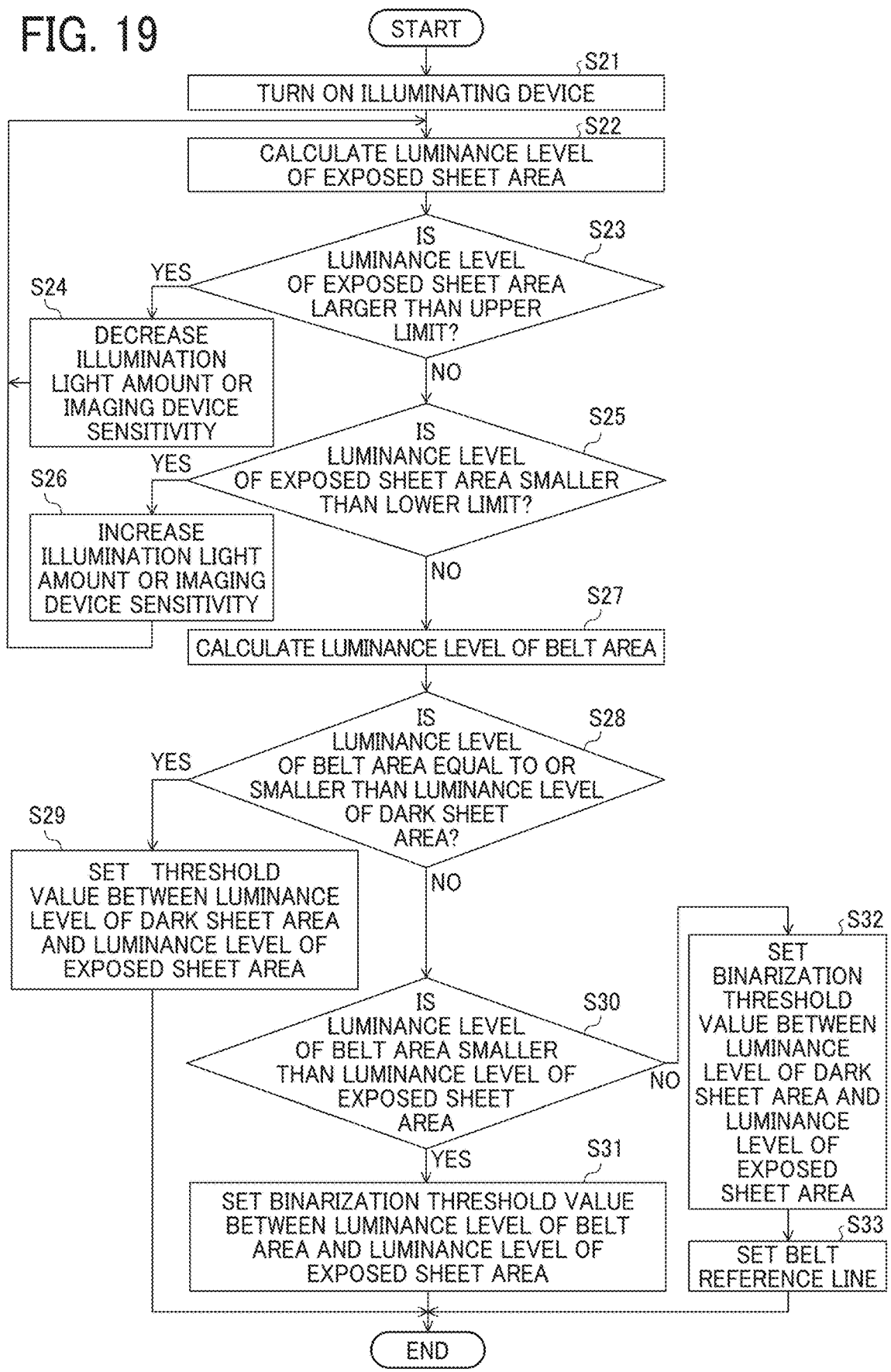
FIG. 19 is a flowchart for adjusting both the imaging condition and the binarization threshold value.

FIG. 19 is a flowchart for adjusting both the imaging condition and the binarization threshold value.

Firstly, the controller 60 adjusts the imaging condition. Similar to the above description, the imaging device 31 captures the image including the uppermost sheet attracted to the suction belt 21 after the illuminating device 32 is turned on in step S21. The luminance acquisition unit 60b in the controller 60 calculates the average value of pixels in the exposed sheet area α. as the luminance level of the exposed sheet portion in step S22.

Next, the luminance and binarization threshold determination unit 60c in the controller 60 determines whether the calculated luminance level in the exposed sheet area α exceeds an upper limit in step S23. The upper limit is set to be equal to or smaller than a value obtained by subtracting the variation amount of the luminance values of the sheet from the upper limit (255) of the luminance value because the binarization threshold value is also changed in the present embodiment. For example, the upper limit is set to be equal to or smaller than "205" because the luminance values of the sheet varies by about 50 as illustrated in FIGS. 17 and 18. Setting the upper limit as described above prevents the luminance value of the exposed sheet portion from being saturated to the upper limit of luminance value even for a sheet having a high reflectance.

When the luminance level in the exposed sheet area α exceeds the upper limit (YES in step S23), the controller 60 decreases the light amount illuminated by the illuminating device 32 or the sensitivity of the imaging device 31 in step S24. When the luminance level in the exposed sheet area α is equal to or smaller than the upper limit (NO in step S23), the controller 60 determines whether the luminance level in the exposed sheet area α is smaller than a lower limit in step S25. The lower limit is equal to or larger than a value obtained by adding the variation amount of the luminance values of the sheet to the lower limit value (0) of the luminance value. The lower limit is set to be equal to or larger than "50" because the luminance values of the sheet varies by about 50 as illustrated in FIGS. 17 and 18. Setting the lower limit to be equal to or larger than 50 prevents the luminance value of the exposed sheet portion of the sheet having a low reflectance from being saturated to the lower limit of luminance value "0". As a result, the controller can set the binarization threshold value between the luminance values of the exposed sheet portion and the luminance values of the shadow portion of the sheet.

In the flow illustrated in FIG. 19, the luminance level in the exposed sheet area α is allowed to be equal to or larger than 50 and equal to or smaller than 205. Accordingly, the frequency of changing the imaging condition in the above-described adjustment is less than that in the adjustment in which the imaging condition is adjusted so that the luminance level in the exposed sheet area is near the fixed binarization threshold value (in FIGS. 17 and 18, the luminance value:100). As a result, the adjustment time of the imaging condition can be shortened. The controller can set the luminance values of the exposed sheet portion of any sheet having from a low reflectance to a high reflectance so as not to be saturated.

After the controller adjusts the imaging condition so as to be the luminance level in the exposed sheet area α within the range between the upper limit and the lower limit, the controller controls the imaging device to capture the image under the adjusted imaging condition and send the image to the luminance acquisition unit 60b. In step S27, the luminance acquisition unit 60b calculates the luminance level in a belt area γ illustrated in FIG. 15. Next, the luminance and binarization threshold determination unit 60c determines the binarization threshold value.

Specifically, the luminance and binarization threshold determination unit 60c determines whether a luminance level in a belt area γ is equal to or smaller than the luminance level in the dark sheet portion. When the luminance level in the belt area γ is equal to or smaller than the luminance level in the dark sheet area (YES in step S28), the luminance and binarization threshold determination unit 60c sets the binarization threshold value between the luminance level in the exposed sheet area α and the luminance level in the dark sheet portion in step S29. The above-described luminance level in the dark sheet portion may be calculated by subtracting a predetermined luminance value difference between the luminance level in the exposed sheet portion and the luminance level in the dark sheet portion from the luminance level in the exposed sheet area α calculated in step S22. Alternatively, the luminance acquisition unit 60b may calculate the average value calculated from luminance values of pixels in the dark sheet area β as the luminance level in the dark sheet portion.

Setting the binarization threshold value between the luminance values of the exposed sheet portion and the luminance values of the dark sheet portion when the luminance level in the belt area is equal to or smaller than the luminance level in the dark sheet area enables forming the image binarized by the set binarization threshold value so as to include the black image as the belt and the dark sheet portion and the white image as the exposed sheet portion. As a result, the controller 60 can detect the sheet and the belt suction surface 21a to which the uppermost sheet is attracted from the captured image. The belt suction surface 21a may be detected from the monochrome image obtained by the binarization processing of the captured image using a predetermined belt reference line, which is described below. However, detecting the belt suction surface 21a from the captured image as described above has the following advantage. Detecting the belt suction surface 21a is not affected by errors due to manufacturing variations or component variations. As a result, the controller can accurately detect the belt suction surface 21a.

When the luminance level in the belt area γ is larger than the luminance level in the dark sheet area (NO in step S28), the luminance and binarization threshold determination unit 60c determines whether the luminance level in the belt area γ is smaller than the luminance level in the exposed sheet area α in step S30. When the luminance level in the belt area γ is smaller than the luminance level in the exposed sheet area α (YES in step S30), the luminance and binarization threshold determination unit 60c sets the binarization threshold value between the luminance level in the exposed sheet area α and the luminance level in the belt area γ in step S31. Similar to the above description, setting the binarization threshold value as described above enables forming the image binarized by the set binarization threshold value so as to include the black image as the belt and the dark sheet portion and the white image as the exposed sheet portion. As a result, the controller 60 can detect the sheet and determine the boundary between the suction belt 21 and the uppermost sheet based on the captured image.

When the luminance level in the belt area γ is equal to or larger than the luminance level in the exposed sheet area α (NO in step S30), the luminance and binarization threshold determination unit 60c sets the binarization threshold value between the luminance level in the exposed sheet area α and the luminance level in the dark sheet portion in step S32. Thus, the monochrome image binarized by the set binarization threshold value includes the white image as the exposed sheet portion and the black image as the shadow portion of the sheet, and the controller can detect the sheet. However, since the luminance level in the belt area γ is equal to or larger than the luminance level of the exposed sheet area α, the belt in the image binarized is the white image, and the controller cannot determine the boundary between the uppermost sheet and the suction belt 21 and cannot check the belt suction surface 21a. In this case, the controller sets a predetermined belt reference line in the monochrome image in step S33 and uses a belt reference plane expressed by the belt reference line as the belt suction surface 21a.

The configurations described above are examples, and aspects of the present disclosure provide respective effects as follows.

First Aspect

In a first aspect, a sheet feeding device such as the sheet feeding device 200 includes a sheet tray such as the sheet tray 10, a blower such as the blower device 17, a feeder such as the feeding unit 20, an illuminator such as the illuminating device 32, an imager such as the imaging device 31, and circuitry such as the controller 60 and the sensitivity adjustment unit 31b. The sheet tray stacks a sheet bundle. The blower blows air to the sheet bundle stacked on the sheet tray and floats an uppermost sheet of the sheet bundle. The feeder feeds the uppermost sheet. The illuminator illuminates the uppermost sheet floating. The imager captures an image including the uppermost sheet illuminated. The circuitry adjusts an imaging condition based on the image captured.

For example, when the sheet having the low reflectance such as the black sheet is stacked on the sheet tray, the luminance value of the exposed sheet portion that is a part of the sheet illuminated by the illuminator and the part of the image captured by the imager is smaller than the threshold value of the luminance value for the binarization processing and is converted into the luminance value "0" by the binarization processing. As a result, the controller 60 may not detect the sheet from the monochrome image after the binarization processing. Contrary to the above, when the sheet having the high reflectance such as a glossy sheet is stacked on the sheet tray, the luminance value of the dark sheet portion illuminated by a smaller light amount by the illuminator than the leading end portion of the sheet exceeds the threshold value of the luminance value for the binarization processing and is converted into a luminance value "255" by the binarization processing. As a result, the dark sheet portion is also converted into white similarly to the sheet exposed portion. As a result, the boundary of the floating sheets cannot be determined based on the monochrome image after the binarization processing, and the sheet may not be detected from the monochrome image after the binarization processing.

As described above, depending on the sheets stacked on the sheet tray, there is a risk where the sheet cannot be detected from the monochrome image after the binarization processing.

To avoid the risk, the sheet feeding device in the first aspect includes the circuitry to adjust the imaging condition based on the image of the sheet that is illuminated by the illuminator and captured by the imager. For example, if the luminance value of the exposed sheet portion in the image of the sheet captured is smaller than the threshold value of the luminance value for the binarization processing, the circuitry can adjust and increase the imaging condition such as at least one of the sensitivity of the imager or the light amount of the illuminator so that the luminance value of the exposed sheet portion is larger than the threshold value of the binarization processing. As a result, even in the sheet having the low reflectance such as the black sheet, the above-described configuration can set the threshold value of the luminance value for the binarization processing of the exposed sheet portion in the image of the sheet captured under the adjusted imaging condition to be larger than the threshold value for the binarization processing and satisfactorily detect the sheet from the monochrome image after the binarization processing of the image of the sheet captured under the adjusted imaging condition.

For example, if the luminance value of the dark sheet portion in the image of the sheet captured is larger than the threshold value of the luminance value for the binarization processing, the circuitry can adjust and decrease the imaging condition such as at least one of the sensitivity of the imager or the light amount of the illuminator so that the luminance value of the dark sheet portion is smaller than the threshold value for the binarization processing. As a result, even in the sheet having the high reflectance such as the glossy sheet, the above-described configuration can set the threshold value of the luminance value for the binarization processing of the dark sheet portion in the image of the sheet captured under the adjusted imaging condition to be smaller than the threshold value for the binarization processing and satisfactorily detect the sheet from the monochrome image after the binarization processing of the image of the sheet captured under the adjusted imaging condition.

Since the circuitry adjusts the imaging condition based on the image of the sheet captured, as described above, the circuitry can detect the sheet from the image of the sheet captured even if the sheet has a high reflectance or a low reflectance and check the floating state of the sheet.

Second Aspect

In a second aspect, the circuitry such as the controller 60 and the sensitivity adjustment unit 31b in the sheet feeding device according to the first aspect acquires the luminance value of the exposed sheet portion that is the leading end portion of the uppermost sheet in the image captured and adjusts the imaging condition to set the luminance value within a predetermined range.

According to the second aspect, the controller can set the luminance values of the exposed sheet portion larger than the binarization threshold value and the luminance values of the dark sheet portion smaller than the binarization threshold value as described with reference to FIG. 16. As a result, the monochrome image after the captured image is binarized includes the white image as the exposed sheet portion and the black image as the dark sheet portion, and the controller can satisfactorily detect the sheet from the monochrome image and check the floating state of the sheet.

Third Aspect

In a third aspect, the circuitry such as the sensitivity adjustment unit 31*b* in the sheet feeding device according to the first aspect or the second aspect adjusts sensitivity of the imager as the imaging condition.

According to the third aspect, increasing the sensitivity increases the luminance value of the captured image, and decreasing the sensitivity decreases the luminance value of the captured image as described in the embodiments. Accordingly, the controller can adjust the luminance values of the exposed sheet portion to be larger than the binarization threshold value and the luminance values of the dark sheet portion to be smaller than the binarization threshold value.

Fourth Aspect

In a fourth aspect, the circuitry such as the light amount control unit 60*d* of the controller 60 in the sheet feeding device according to the first aspect to the third aspect adjusts, as the imaging condition, a light amount with which the illuminator such as the illuminating device 32 illuminates the uppermost sheet.

According to the fourth aspect, increasing the light amount with which the illuminator such as the illuminating device 32 illuminates the uppermost sheet can increase the luminance value of the captured image, and decreasing the light amount can decrease the illuminance value of the captured image. Accordingly, the controller can adjust the luminance values of the exposed sheet portion to be larger than the binarization threshold value and the luminance values of the dark sheet portion to be smaller than the binarization threshold value.

Fifth Aspect

In a fifth aspect, the sheet feeding device according to any one of the first to fourth aspects further includes a binarization threshold value determination unit such as the luminance and binarization threshold determination unit 60*c* that determines a threshold value for binarization processing to binarize the image based on the image captured by the imager such as the imaging device 31 under the imaging condition adjusted by the circuitry.

According to the fifth aspect, the frequency of changing the imaging condition can be reduced, and the adjustment time can be shortened, as described with reference to FIG. 19.

Sixth Aspect

In a sixth aspect, the sheet feeding device according to the fifth aspect includes the feeder such as the feeding unit 20 including a suction conveyer such as the suction belt 21 to attract and convey the uppermost sheet. In addition, the sheet feeding device according to the fifth aspect includes the binarization threshold value determination unit such as the luminance and binarization threshold determination unit 60*c*. The binarization threshold value determination unit sets the binarization threshold value larger than a luminance value of the suction conveyer calculated based on the image including the suction conveyer captured by the imager such as the imaging device 31 using the imaging condition adjusted by the circuitry.

According to the sixth aspect, the suction conveyer becomes the black image in the image captured by the imager such as the imaging device 31 after the binarization processing as described with reference to FIG. 19. Thus, the controller can distinguish between the suction conveyer and the exposed sheet portion that is the white image and check the suction surface of the suction conveyer to which the uppermost sheet is attracted from the image after the binarization processing.

Seventh Aspect

In a seventh aspect, the sheet feeding device according to any one of the first aspect to the sixth aspect includes the illuminator such as the illuminating device 32 disposed below the imager such as the imaging device 31.

According to the seventh aspect, the light of the illuminator such as the illuminating device 32 can mainly apply the light to the leading end portion of the sheet, which increases the difference between the luminance value of the leading end portion of the sheet and the luminance value of the portion of the sheet upstream from the leading end portion in the sheet feed direction, as described in the embodiment. As a result, the binarization processing can satisfactorily form the white image as the exposed sheet portion and the black image as the shadow portion of the sheet.

Eighth Aspect

In an eighth aspect, the sheet feeding device according to any one of the first aspect to the seventh aspect includes the imager such as the imaging device 31 that is arranged nearer one side of a sheet of the sheet bundle in the width direction of the sheet than the other side of the sheet so that the imaging surface of the imager faces the center portion of the leading end of the sheet in the width direction of the sheet.

According to the eighth aspect, the imager can capture the image of the center portion of the sheet in the width direction.

Ninth Aspect

In a ninth aspect, an image forming apparatus such as the image forming apparatus 1 includes the sheet feeding device such as the sheet feeding device 200 according to any one of the first aspect to the eighth aspect.

According to the ninth aspect, the controller in the image forming apparatus can satisfactorily check the floating state of the sheet and control the blower based on the checked floating state of the sheet to prevent the occurrence of a feeding failure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A sheet feeding device comprising:
a sheet tray configured to stack sheets;
a blower configured to blow air to the sheets stacked on the sheet tray and float an uppermost sheet of the sheets;
a feeder configured to feed the uppermost sheet;
an illuminator configured to illuminate the uppermost sheet floating;
an imager configured to capture an image including the uppermost sheet illuminated by the illuminator; and
circuitry configured to adjust an imaging condition based on the image captured by the imager,
wherein the illuminator is below the imager and further configured to illuminate a center portion of a leading end of the floating uppermost sheet, the center portion being in a width direction of the uppermost sheet, and
wherein the circuitry is configured to acquire a luminance value of an exposed sheet portion that is a leading end portion of the uppermost sheet in the image captured and adjust the imaging condition to set the luminance value within a predetermined range.

2. The sheet feeding device according to claim 1, wherein the circuitry is configured to adjust sensitivity of the imager as the imaging condition.

3. The sheet feeding device according to claim 1, wherein the circuitry is configured to adjust, as the imaging condition, a light amount with which the illuminator illuminates the uppermost sheet.

4. The sheet feeding device according to claim 1, wherein the circuitry is configured to determine a threshold value for binarization processing to binarize the image based on the image captured by the imager under the imaging condition adjusted by the circuitry.

5. The sheet feeding device according to claim 4, wherein the feeder includes a suction conveyer configured to attract and convey the uppermost sheet, and
wherein the circuitry is configured to determine the threshold value larger than a luminance value of the suction conveyer calculated based on the image including the suction conveyer, the image being captured by the imager using the imaging condition adjusted by the circuitry.

6. The sheet feeding device according to claim 1, wherein the imager is arranged nearer one side of a sheet of the sheets in a width direction of the sheet than the other side of the sheet, and
wherein an imaging surface of the imager faces a center portion of the sheet in the width direction in a leading end of the sheet in a conveyance direction of the sheet.

7. An image forming apparatus comprising
the sheet feeding device according to claim 1.

8. The sheet feeding device according to claim 1, wherein the adjusting the imagining condition includes selectively alter at least one of a sensitivity of the imager or an illumination light amount of the illuminator based on a luminance level of an exposed sheet area of the uppermost sheet and a luminance level of a dark sheet area of the uppermost sheet.

* * * * *